United States Patent [19]

Sugawara

[11] Patent Number: 4,735,764

[45] Date of Patent: Apr. 5, 1988

[54] OPEN WAVEGUIDE ELECTROMAGNETIC WAVE RADIATOR FOR SECONDARY HEATING A PLASMA IN A NUCLEAR FUSION REACTOR

[75] Inventor: Toru Sugawara, Fujisawa, Japan

[73] Assignee: Kabushiki Kaisha Toshiba, Kawasaki, Japan

[21] Appl. No.: 931,930

[22] Filed: Nov. 17, 1986

Related U.S. Application Data

[63] Continuation of Ser. No. 602,366, Apr. 20, 1984, abandoned.

[30] Foreign Application Priority Data

Apr. 28, 1983 [JP] Japan .................................. 58-73804

[51] Int. Cl.[4] .............................................. G21B 1/00
[52] U.S. Cl. ................................ 376/132; 219/121 P; 315/111.71; 333/99 R; 376/123
[58] Field of Search ............... 376/132, 131, 123, 121; 219/121 P, 121 PY; 315/39, 111.21, 111.71; 333/99 P, 26

[56] References Cited

U.S. PATENT DOCUMENTS

| | | | |
|---|---|---|---|
| 2,409,913 | 10/1946 | Tonks | 331/74 |
| 2,422,058 | 6/1947 | Whinnery | 333/239 |
| 2,497,670 | 2/1950 | Hanson et al. | 219/10.55 A |
| 2,633,493 | 3/1953 | Cohn | 333/26 |
| 2,920,295 | 1/1960 | Allaries et al. | 333/113 |
| 3,160,566 | 12/1964 | Dandle et al. | 376/123 |
| 3,239,713 | 3/1966 | Evans et al. | 333/26 X |
| 4,057,462 | 11/1977 | Jassby et al. | 376/107 |
| 4,110,595 | 8/1978 | Brambilla et al. | 219/121 P |
| 4,292,124 | 9/1981 | Fisch | 376/132 |
| 4,511,782 | 4/1985 | Motley et al. | 315/111.21 X |

FOREIGN PATENT DOCUMENTS

| | | | |
|---|---|---|---|
| 2340628 | 9/1977 | France . | |
| 0170790 | 9/1984 | Japan | 376/123 |
| 1590320 | 5/1981 | United Kingdom . | |
| 0841567 | 4/1982 | U.S.S.R. | 376/132 |

OTHER PUBLICATIONS

Okazaki, T and Tanaku Y; "Reactor-Core Plasma Related Technology—Plasma Heating", Journal of Fusion Energy; vol. 3, No. 5/6; 1983; Section I.3.1, pp. 379-384.
Olson, L. McWilliams R., Glanz, J. and Motley R. W.; "Coupling to the Fast Wave via a Phased Waveguide Array", Nuclear Fusion; vol. 24, No. 8 (1984); pp. 1085-1087.

Primary Examiner—Eugene R. LaRoche
Assistant Examiner—Benny T. Lee
Attorney, Agent, or Firm—Oblon, Fisher, Spivak, McClelland & Maier

[57] ABSTRACT

An open waveguide electromagnetic wave radiator is used to radiate electromagnetic waves of cyclotron frequency to plasma within a vacuum container. This radiator comprises a waveguide having evacuation holes and containing ridges having a T-shaped cross-section, a radiator section connected to, and integrally formed with, the open end of the waveguide, evacuation pipes connected to the evacuation holes, a chamber enclosing the closed end portion of the waveguide and the evacuation pipes, and a pump for evacuating the chamber. The evacuation holes are made in that wall of the waveguide to which the leg of one of the ridges is connected.

7 Claims, 3 Drawing Sheets

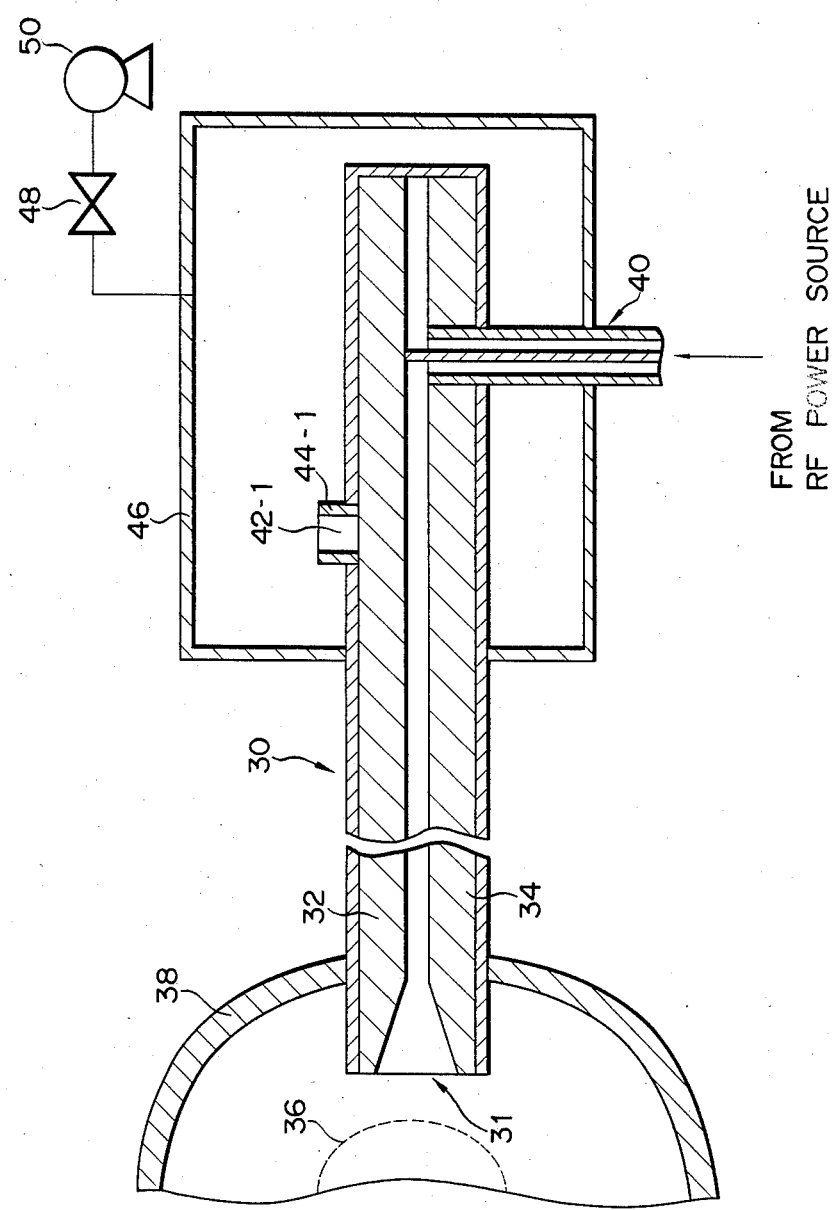
F I G. 2

OPEN WAVEGUIDE ELECTROMAGNETIC WAVE RADIATOR FOR SECONDARY HEATING A PLASMA IN A NUCLEAR FUSION REACTOR

This application is a continuation of application Ser. No. 602,366, filed Apr. 20, 1984, now abandoned.

BACKGROUND OF THE INVENTION

This invention relates to an open waveguide electromagnetic wave radiator for heating a plasma, and more particularly to an electromagnetic wave radiator whose waveguide maintains a high vacuum during use.

One of the known radiators of this type is a radio frequency (RF) heater which is used in a nuclear fusion reactor.

FIG. 1 schematically shows a nuclear fusion reactor. The reactor comprises a doughnut-shaped vacuum container 12 with coils $16_1$–$16_n$ and coils $18_1$–$18_m$ are both wound about the container 12. A plasma 14 is produced within the container 12. Neutral beam injectors (NBI) $20_1$ to $20_6$ are installed around the container 12 and coupled thereto. They inject energetic atoms into the container 12, thus heating the plasma to a predetermined temperature.

A RF heater 22 extends through the gap between two of the NBIs and is connected to the vacuum container 12. It comprises a waveguide 24 opening at one end, a radiator 25, a protective wall 26 and a power feed line 28. The radiator 25 is placed within the vacuum container 12. The open end of the waveguide 24 communicates with the radiator 25. The waveguide 24 is wrapped by the protective wall 26. Electromagnetic waves of cyclotron frequency for exciting plasma ions are supplied to the waveguide 24 from a RF power source (not shown) through the power feed line 28. An evacuation means (not shown) is coupled to the vacuum container 12. The evacuation means draws air out of the vacuum container 12, thus maintaining a vacuum in not only the container 12, but also the waveguide 24.

The transmissive power of electromagnetic waves through the waveguide 24 depends on the vacuum in the waveguide 24. The higher the vacuum, the higher the power. The waveguide 24 is made of metal. Various gases may be released from the metal and may fill up the waveguide 24. If this happens, the vacuum will be degraded. Gases are drawn from the waveguide 24 only through the aperture of the radiator 25. Unless this evacuation catches up with the release of gases, the transmissive power of electromagnetic waves will be lowered. The reduction in transmissive power does not matter when a relatively small amount of power is supplied to the waveguide 24 and the waveguide 24 is thus relatively short. When a great amount of power is supplied to the waveguide 24 and the waveguide 24 must inevitably be long, the transmissive power of electromagnetic waves will be reduced, thus causing problems.

To make matter worse, the gases from the waveguide 24 may flow into the vacuum container 12, thus lowering the vacuum within the container 12. This leads to a reduction in the heating efficiency of plasma. In order to prevent this, a large, powerful evacuation means must be installed.

SUMMARY OF THE INVENTION

Accordingly, the object of the present invention is to provide an open waveguide electromagnetic wave radiator for heating plasma, whose waveguide can maintain a high vacuum without assistance of a large, powerful evacuation means, thereby enhancing the transmissive power of electromagnetic waves.

According to this invention, there is provided an open waveguide electromagnetic wave radiator which comprises a waveguide opening at one end and having an evacuation hole made in the wall of the waveguide, a radiator coupled to the open end of the waveguide, a pair of ridges having a T-shaped cross section and on opposite sides of the waveguide, and an evacuation device connected to the waveguide to evacuate the waveguide through the evacuation hole.

Since the waveguide is evacuated through not only the aperture of the radiator but also the evacuation hole made in the wall of the waveguide. This enhances the speed of evacuation. Consequently, gases are prevented from flowing into a plasma within the vacuum container from the waveguide, and the transmission efficiency of electromagnetic waves through the waveguide is raised.

BRIEF DESCRIPTION OF THE DRAWINGS

FIG. 2 is a cross sectional view of an open waveguide electromagnetic wave radiator according to the present invention.

DETAILED DESCRIPTION OF THE PREFERRED EMBODIMENT

Figure 1:
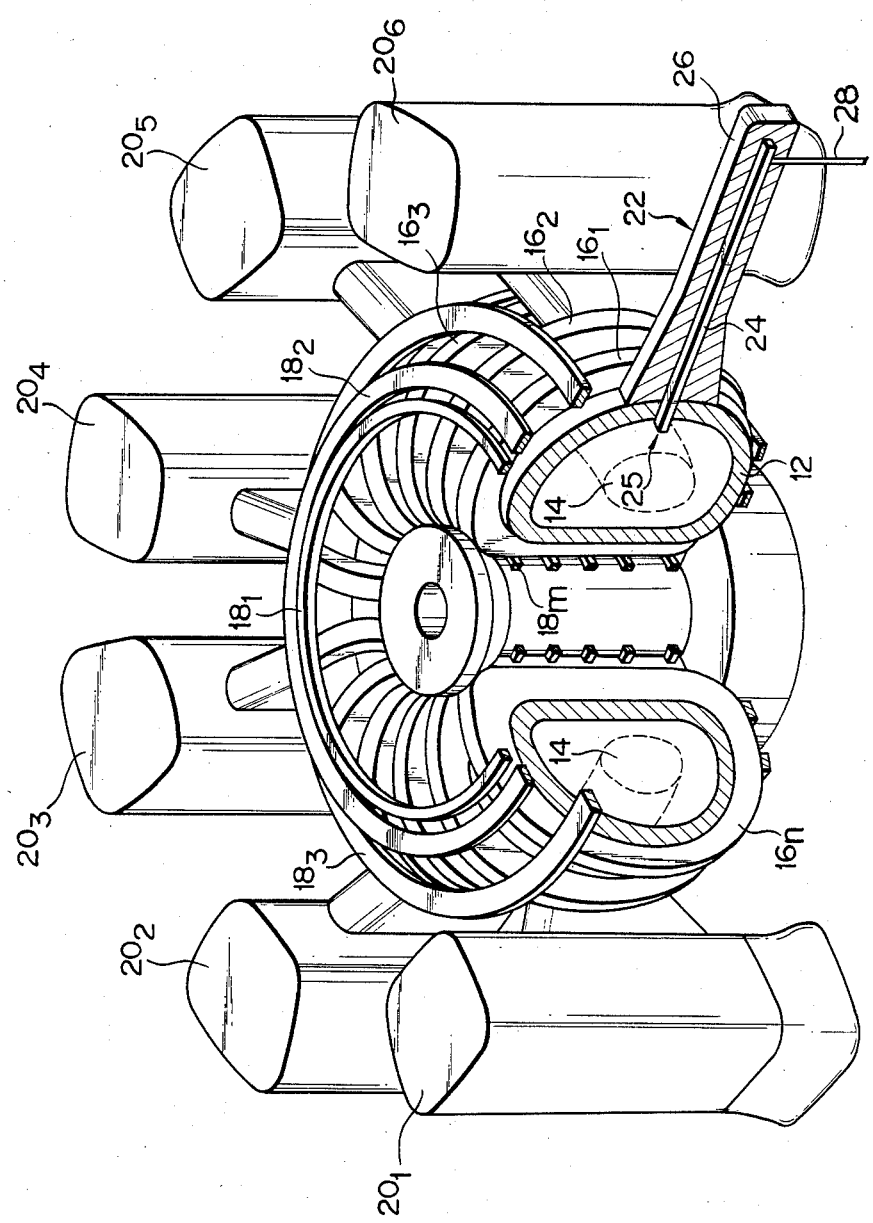
FIG. 1 schematically shows a nuclear fusion reactor using a conventional open waveguide electromagnetic wave radiator.
Figure 3:
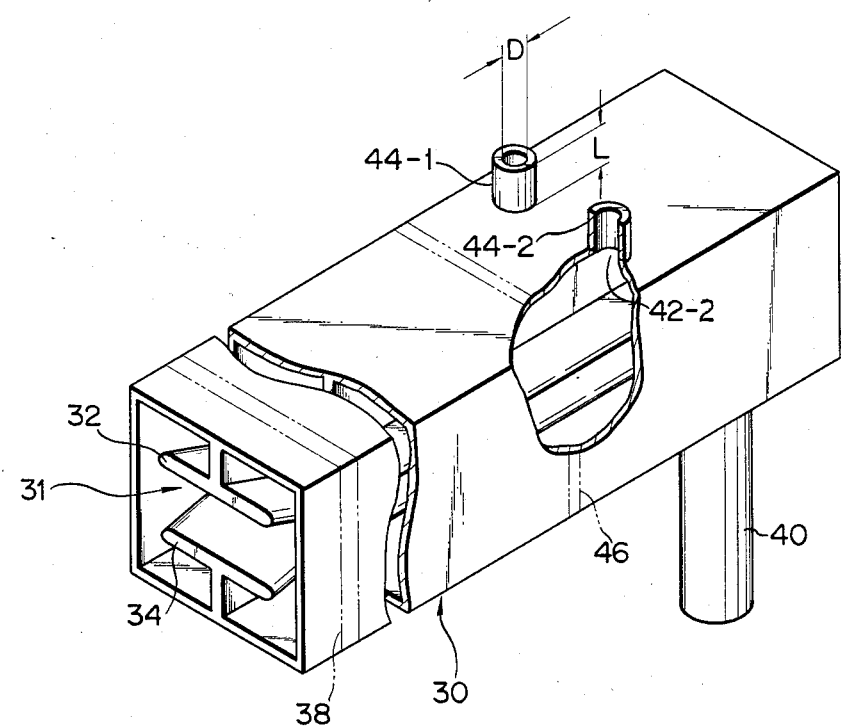
FIG. 3 is a partially broken, perspective view of the radiator shown in FIG. 2.

An open waveguide electromagnetic wave radiator according to the invention will now be described with reference to FIGS. 2 and 3. FIG. 2 is a cross sectional view of the radiator, and FIG. 3 is a partially broken, perspective view of the same. This radiator comprises a waveguide 30 opening at one end. As shown in FIG. 3, the waveguide 30 has a rectangular cross section. A pair of ridges 32 and 34, which have a T-shaped cross section, are provided within the waveguide 30. More precisely, these ridges 32, 34 have their legs connected to the opposing inner surfaces of the waveguide 30. The gap between the ridges 32, 34 is constant for the greater part of the waveguide 30 and increases toward the open end of the waveguide 30, as illustrated in FIG. 2. The open end portion, i.e., the radiator section 31, of the waveguide 30 extends into the vacuum container 38 of a nuclear fusion reactor, which holds plasma 36.

A coaxial cable 40 is connected to the closed end of the waveguide 30. Electromagnetic waves of the cyclotron frequency of plasma ions are supplied to the waveguide 30 via this cable 40 from a RF power source (not shown). The coaxial cable 40 comprises an inner conductor and an outer conductor which are connected to the ridges 32 and 34, respectively. The electromagnetic waves are therefore transmitted by the ridges 32 and 34 and are injected from the radiator section 31 into the plasma 36 held in the vacuum container 38.

The evacuation holes 42-1 and 42-2 are made in that wall of the waveguide 40 to which the upper ridge 32 is connected, they are located symmetrically with respect to the leg of the ridge 32. Through these holes 42-1, 42-2, gases released from the metal constituting the waveguide 30 may be exhausted. Two evacuation pipes 44-1 and 44-2 are connected to the waveguide 30 and communicate with the holes 42-1, 42-2, respectively.

The positions of the evacuation holes 42-1, 42-2 are important. The electromagnetic field within the wave guide 30 is most intense at both arms of either ridge. If the holes 42-1, 42-2 are vertically cut in the legs of the ridges 32, 34, the electromagnetic field will concentrates in the holes 42-1, 42-2. This would result in a voltage breakdown. To avoid this voltage breakdown, the holes 42-1, 42-2 must be made in the walls of the waveguide 30.

As illustrated in FIG. 2, the closed end portion of the waveguide 30 is enclosed in a vacuum chamber 46. Gases are discharged from the chamber 56 by a pump 50 through a valve 48, thus creating a vacuum within the chamber 46. Therefore, the waveguide 30 is automatically evacuation through the evacuation holes 42-1, 42-2, shown in FIG. 3. At the same time, the gases released from the metal forming the waveguide 30 flows into the vacuum chamber 46 through the evacuation holes 42-1, 42-2. A high vacuum produced also within the waveguide 30, and the gases are prevented from flowing into the vacuum container 38.

The size of the evacuation pipes 44-1, 44-2, shown in FIG. 3, is important; it determines the evacuation conductance C of the pipes 44-1, 44-2 with respect to the gases. The evacuation conductance C of either pipe is given as follows:

$$C = 121 \times (D^3/L) \tag{1}$$

for air where D is the inner diameter of the pipe and L is the length of the pipe.

Needless to say, some of the electromagnetic waves guided by the waveguide 30 leak through the evacuation holes 42-1, 42-2. The cyclotron frequency is 120 MHz, a relatively low frequency. Obviously, the length of the electromagnetic waves in free space is extremely longer than the diameter D of the evacuation pipes 44-1, 44-2. Therefore, the cutoff frequency of the pipe is higher than the cyclotron frequency. The waves cannot pass through each evacuation pipe. The ratio $P_l$ of leak power to total transmission power is given:

$$P_l = A \times \exp(-7.3647 \times L/D) \tag{2}$$

where A is a constant which depends on the waveguide dimensions where k is a constant.

The optimum values for the inner diameter D and length L of either evacuation pipes, which increase the evacuation conductance C to a maximum and reduces the leak power ratio $P_l$ to an allowable level, can thus be calculated from equations (1) and (2). The evacuation conductance C for the entire waveguide 30 is of course the sum of the evacuation conductances of the pipes 44-1, 44-2, and the leak power ratio $P_l$ for the whole waveguide 30 is also the sum of the leak power ratios of the pipes 44-1, 44-2.

As described above, in the present invention, evacuation holes are made in the wall of a waveguide and air and gas is drawn from the waveguide through these holes, thus enhancing the vacuum within the waveguide. As a result, the transmissive power of electromagnetic waves can be raised and gases can be prevented from flowing from the waveguide into the plasma held within a vacuum container. Further, since the closed end portion of the waveguide is enclosed in a vacuum chamber, only one vacuum pump connected to this chamber suffices to evacuate the waveguide through the evacuation holes, no matter how many holes the waveguide has. Still further, since the cutoff frequency of the evacuation holes is higher than the cyclotron frequency of the plasma, they allows the passage of gases and do not allow that of electromagnetic waves.

The present invention is not limited to the embodiment described above. The evacuation holes need not be circular; they may be elliptical or rectangular. Further, the waveguide may have one evacuation hole or three or more evacuation holes, instead of two.

What is claimed is:

1. An open waveguide electromagnetic wave radiator for heating a plasma, in a nuclear fusion reactor comprising:
   an RF heater, including a waveguide having an opening at one end directed to the plasma through a radiator portion, a short circuited end at the other end of the waveguide, a pair of ridges extending between the opening and the short circuited end, each ridge having a T-shaped cross section, each ridge connected to a respective inner surface side of said waveguide, with evacuation means made in at least one of said inner surface sides;
   evacuation pipe means connected to said evacuation means, said pipe means having an internal chord D passing through the center of the cross section of said evacuation pipe means and a length L of said evacuation pipe means, said chord D and length L are determined in accordance with an evacuation conductance C, where $C = 121 \times (D^3/L)$ and a leak power ratio $P_l$, where $P_l = A \times \exp(-7.3647 \times L/D)$ where A is a constant which depends on the waveguide dimensions; and
   pump means adapted to be connected to said evacuation pipe means for evacuating gases from the inside of said waveguide.

2. An open waveguide electromagnetic wave radiator according to claim 1, wherein said waveguide has a rectangular cross section, and wherein said pair of ridges are respectively connected to opposing inner surfaces of said waveguide, and said evacuation means is an aperture made in one of said opposing inner surfaces connected to one of said ridges.

3. An open waveguide electromagnetic wave radiator according to claim 1, wherein said waveguide has a rectangular cross section, and wherein said pair of ridges are connected to opposing inner surfaces of said waveguide, respectively, and said evacuation means comprise a plurality of apertures made in at least one of said inner surfaces connected to one of said ridges.

4. An open waveguide electromagnetic wave radiator according to claim 3, wherein the number of said plurality of apertures is even in number with half of the number of said apertures being arranged symmetrically on each side of the place where the ridge and the inner surface are connected.

5. An open waveguide electromagnetic wave radiator according to claim 1, wherein said pump means has a chamber enclosing said evacuation pipe means and an evacuation pump connected to said chamber.

6. An open waveguide electromagnetic wave radiator according to claim 1, wherein the said internal chord D and length L of said evacuation are determined so that the evacuation conductance C reaches a maximum value and the leak power ratio $P_l$ is reduced to a low value.

7. An open waveguide electromagnetic wave radiator according to claim 1, wherein said reactor has an operating wave frequency and said evacuation pipe means has a pipe having a cross section of such size such that the cutoff frequency of the pipe is higher than said operating wave frequency.

* * * * *